United States Patent
Lehman

(10) Patent No.: US 10,433,482 B2
(45) Date of Patent: Oct. 8, 2019

(54) INTEGRATED LIFT AND FRAME LOCK FOR A FOLDING CORN HEAD ROW SEPARATOR

(71) Applicant: Oxbo International Corporation, Byron, NY (US)

(72) Inventor: Benjamin Lehman, Deer Park, WI (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 15/399,448

(22) Filed: Jan. 5, 2017

(65) Prior Publication Data

US 2018/0184592 A1 Jul. 5, 2018

Related U.S. Application Data

(60) Provisional application No. 62/275,131, filed on Jan. 5, 2016.

(51) Int. Cl.
*A01D 45/02* (2006.01)
*A01D 41/14* (2006.01)

(52) U.S. Cl.
CPC .......... *A01D 45/021* (2013.01); *A01D 41/144* (2013.01)

(58) Field of Classification Search
CPC .... A01D 45/021; A01D 41/144; A01D 47/00; A01B 73/00–067
See application file for complete search history.

(56) References Cited

U.S. PATENT DOCUMENTS

| | | | | |
|---|---|---|---|---|
| 5,673,543 | A * | 10/1997 | Richardson | A01D 41/144 56/228 |
| 7,162,855 | B2 * | 1/2007 | Boeckmann | A01D 41/144 56/15.2 |
| 2002/0035826 | A1 * | 3/2002 | Albinger | A01D 41/144 56/109 |
| 2003/0226342 | A1 * | 12/2003 | Boeckmann | A01D 41/144 56/14.7 |

FOREIGN PATENT DOCUMENTS

| | | |
|---|---|---|
| EP | 0 131 853 A1 | 1/1985 |
| EP | 1 142 467 A1 | 10/2001 |

OTHER PUBLICATIONS

International Search Report and Written Opinion for Application No. PCT/US2017/012344 dated Mar. 16, 2017.

* cited by examiner

*Primary Examiner* — Robert E Pezzuto
*Assistant Examiner* — Adam J Behrens
(74) *Attorney, Agent, or Firm* — Merchant & Gould P.C.

(57) ABSTRACT

A harvester or combine includes a folding corn head with a center section and folding wing sections. A folding row separator cover at the hinge location of the folding head sections folds to an angled position so that the folding action between the wings and the center section is not impaired. A single assembly actuates the folding of the row separator as well as locking and unlocking of the wing sections relative to the center frame section. A hydraulic cylinder actuates a main link that connects to the row separator cover and to a lock pin. Actuation of the hydraulic cylinder raises and lowers the cover and engages and disengages the locking pin.

12 Claims, 16 Drawing Sheets

INTEGRATED LIFT AND FRAME LOCK FOR A FOLDING CORN HEAD ROW SEPARATOR

FIELD OF THE INVENTION

The present invention relates to a folding corn head for a harvester or combine, and, in particular to a corn head row separator with an automatic actuating and wing locking mechanism.

BACKGROUND OF THE INVENTION

Corn heads used for harvesting corn mount on the front of combines and ear corn harvesters or combines. The harvester or combine advances along the corn rows and processes the corn stalks for return to the field and removes the ears of corn from the stalks. Corn heads are configured with dividers or separators to guide the rows of corn plants into gaps formed between the row separators to gathering units extending across the length of the corn head. Each of the row separators includes a forward conical portion that abuts a rear portion that provides a top cover to protect the mechanisms of the gathering units.

The row separators cover the corn head mechanisms to keep the plant stalks and other material from falling into and jamming the mechanical units. It can be appreciated that the row separator covers must be lifted to provide access and conduct maintenance on the gathering and separating mechanisms of the corn head. With some prior art systems, this was simply done with a hinge and a manual support strut. However, other systems were developed that utilized a mechanism to lift and hold the cover in a raised position.

Moreover, with wider heads, it is necessary to fold outer sections of the head for transport. With folding heads, the outer sections of the head are angled upward in some configuration and even inverted on other embodiments to reduce the width of the head for transport. In addition, certain row separator covers at the fold axis of the folding outer sections must be tilted to move them out of the way to allow sufficient space for folding of the outer sections of the head. This tilting motion is separate and different from the lifting of the row separator covers for access and maintenance. At a road transport position, the outer sections are unlocked and raised and the row separator covers are also unlocked. Another step that must occur with unfolding of folding heads is that the outer folding sections of the head must lock into an operating position when completely unfolded to ensure safe and reliable operation. Moreover, locking of the folding sections of the heads at the deployed position must be verified unless the head has a visual verification. It can be further appreciated that for operation the row separator covers must be locked into place so that they protect the mechanisms of the gathering units and so that they do not flop or otherwise become damaged during the folding and unfolding process.

It can therefore be appreciated that a new and improved folding corn head is required. Such a corn head should include row separators that have covers that are automatically actuated to a tilted position for folding of the corn head and the corn head should having folding sections that are also automatically locked. Moreover, the locking of the outer folding sections of the corn head and tilting of the row separator cover at the fold should be actuated by a single mechanism. The present invention addresses these problems as well as others associated with corn heads having folding sections.

SUMMARY

The present invention is directed to a combine or ear corn harvester including a folding corn head. The corn head includes a center section as well as left and right folding wing sections that fold for transportation and storage. The corn head also includes row separators that direct the corn stalks towards the gathering assemblies for processing the corn stalks and removing ears from the stalks.

In order for the wing sections to fold, one of the row separators near the frame hinge for each wing must be raised to an angled position to create sufficient space between the respective folding wing section and the center section. The present invention provides a single actuator that both moves the row separator cover between the angled position for folding and a use position. Moreover, the same assembly provides for automatically locking the frame sections of the head so that the wings are locked when deployed for harvesting. The dual purpose single actuator assembly also provides a clear visual indication when the frames are locked as the row separator cover is lowered.

The combined folding and locking assembly mounts to the corn head frame and to a frame supporting the row separator cover proximate the folding portion of the head frame. The hydraulic cylinder has an extendable rod that connects to a main link. The elongate main link extends forward from the cylinder and at a far end connects to an arm that includes ball joints. The arm connects to a row separator cover frame. The main link also connects to a second link mounting to the hydraulic cylinder and to a lower link attached through an intermediate link connecting to a locking pin for the folding frame of the corn head. The arm at the extended end of the main link generally extends upward and forward while the locking pin extends generally rearward attaching to a lower point of the main link.

When the hydraulic cylinder is actuated to extend the rod, the main link pivots downward and pulls the arm mounting to the row separator cover downward. This moves the row separator to a deployed use position where it covers the gathering assemblies. Moreover, this same motion moves the lower portion of the main link downward and rearward. The downward and rearward motion moves the locking pin to a secure locked position. At this position, the frame sections of the head are securely locked by the pin for use in the extended position. The row separator cover at a lowered position provides a visual indication that the frames are locked for harvesting.

To unlock the frames and to move the folding row separator cover to the position for folding, travel and storage, the rod is retracted into the hydraulic cylinder. This motion of the rod pulls the main link rearward and the far end connecting to the arm upward. The far end of the main link therefore raises the arm to raise the row separator. The same motion of the main link also raises the lower pivot near the hydraulic cylinder and the connecting link pulls the lock pin forward to disengage from the frame. In this position, the frame sections are not locked to one another and the outer frame of each wing is free to be pivoted. The same motion also automatically moves the folding row separator to a position that will not impair folding of the wings relative to the center frame of the head and provides a visual indication. Therefore, the outer wing sections cannot be folded unless the row separator cover at the frame hinge is raised to a position at which it will not impair folding of the head.

It can be appreciated that the present invention uses a single actuator to automatically move the row separator proximate the hinge to a position that allows folding of the wings relative to the head and also automatically disengages the outer wing frames from the center frame to allow for folding. The position of the cover also provides a clear visual indicator to alert operators that the cover and frames are configured for folding. The same mechanism also ensures that when the folding row separator is lowered, that the frames are locked in position and that the head is deployed for use.

BRIEF DESCRIPTION OF THE DRAWINGS

Referring now to the drawings, wherein like reference letters and numerals indicate corresponding structure.

DETAILED DESCRIPTION

Figure 1:
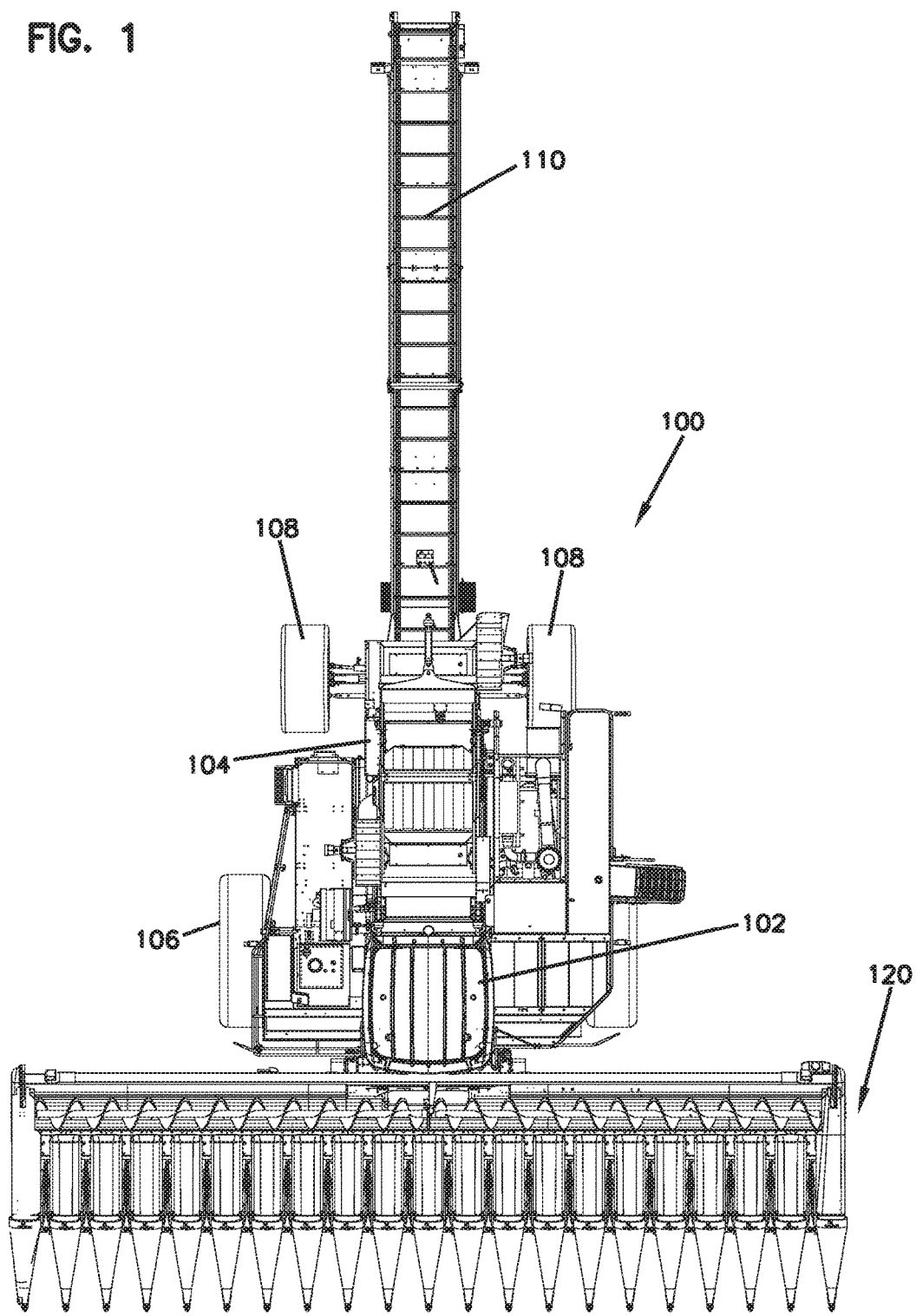
FIG. 1 is a top plan view of a harvester according to the principles of the present invention.
Figure 2:
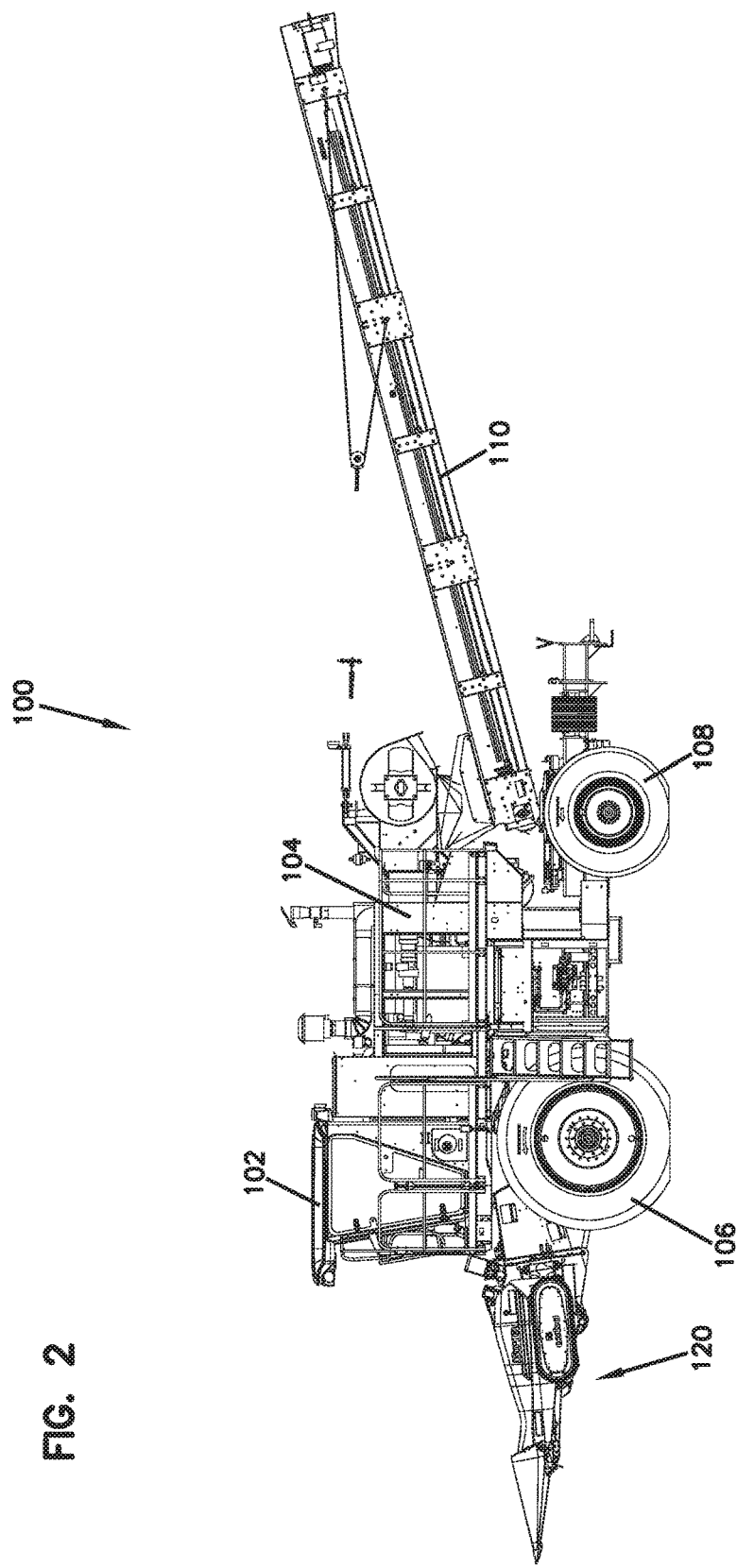
FIG. 2 is a side elevational view of the harvester shown in FIG. 1.

Referring now to the drawings and in particular to FIGS. 1 and 2, there is shown an ear corn harvester, generally designated (100). The present invention is also applicable to a combine. The harvester (100) as shown is particularly configured for harvesting corn. The harvester (100) has a chassis (104) housing crop processing equipment and is supported on driven front wheels (106) and on rear wheels (108). For combines, the chassis (104) includes threshing equipment as is well known in the art. A cab (102) is positioned at the front of the chassis (104) and overlooks a corn head (120). An unloading conveyor (110) extends from the rear of the chassis (104).

Figure 3:
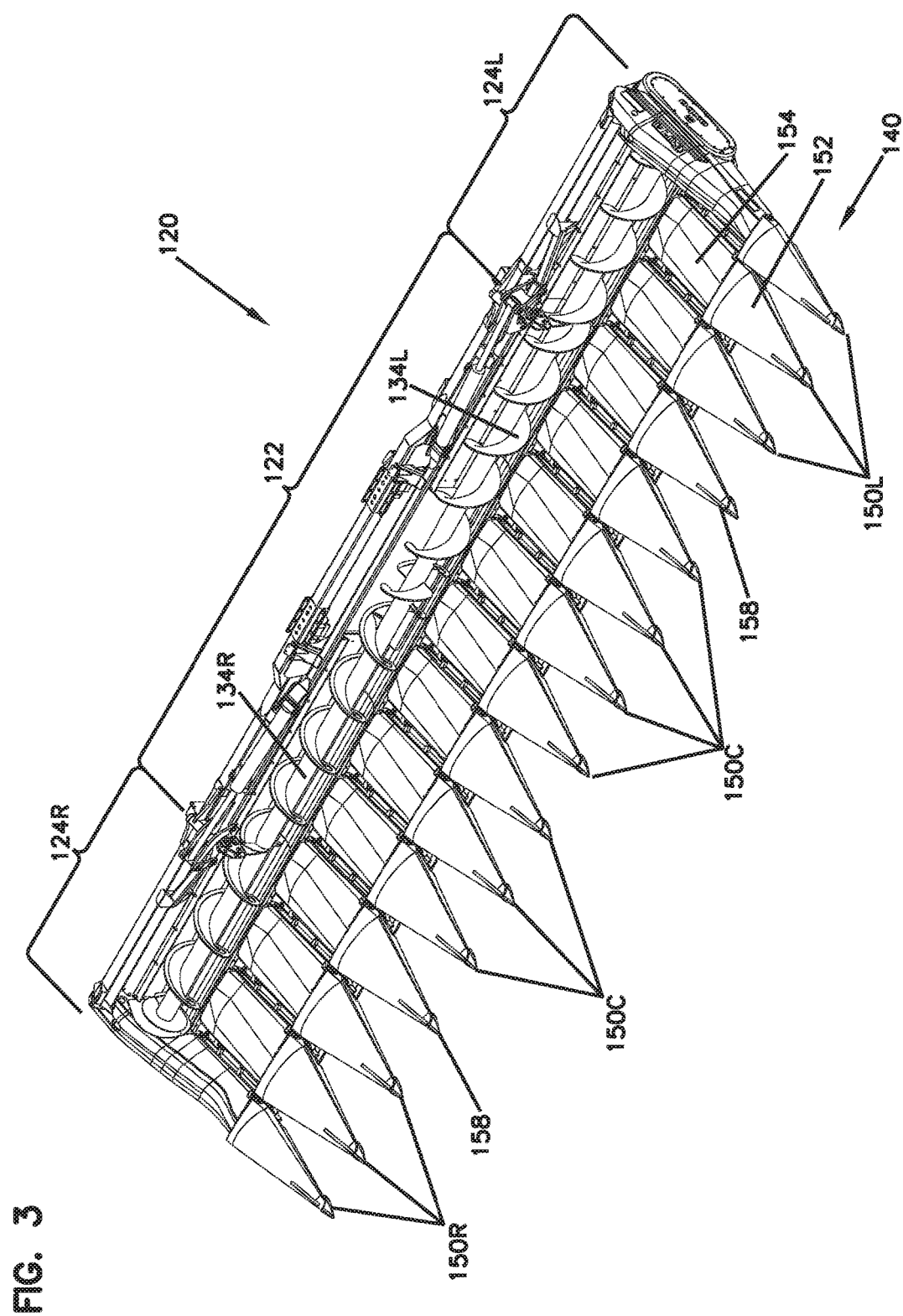
FIG. 3 is a perspective view of a corn head for the harvester shown in FIG. 1 in a deployed position.
Figure 4:
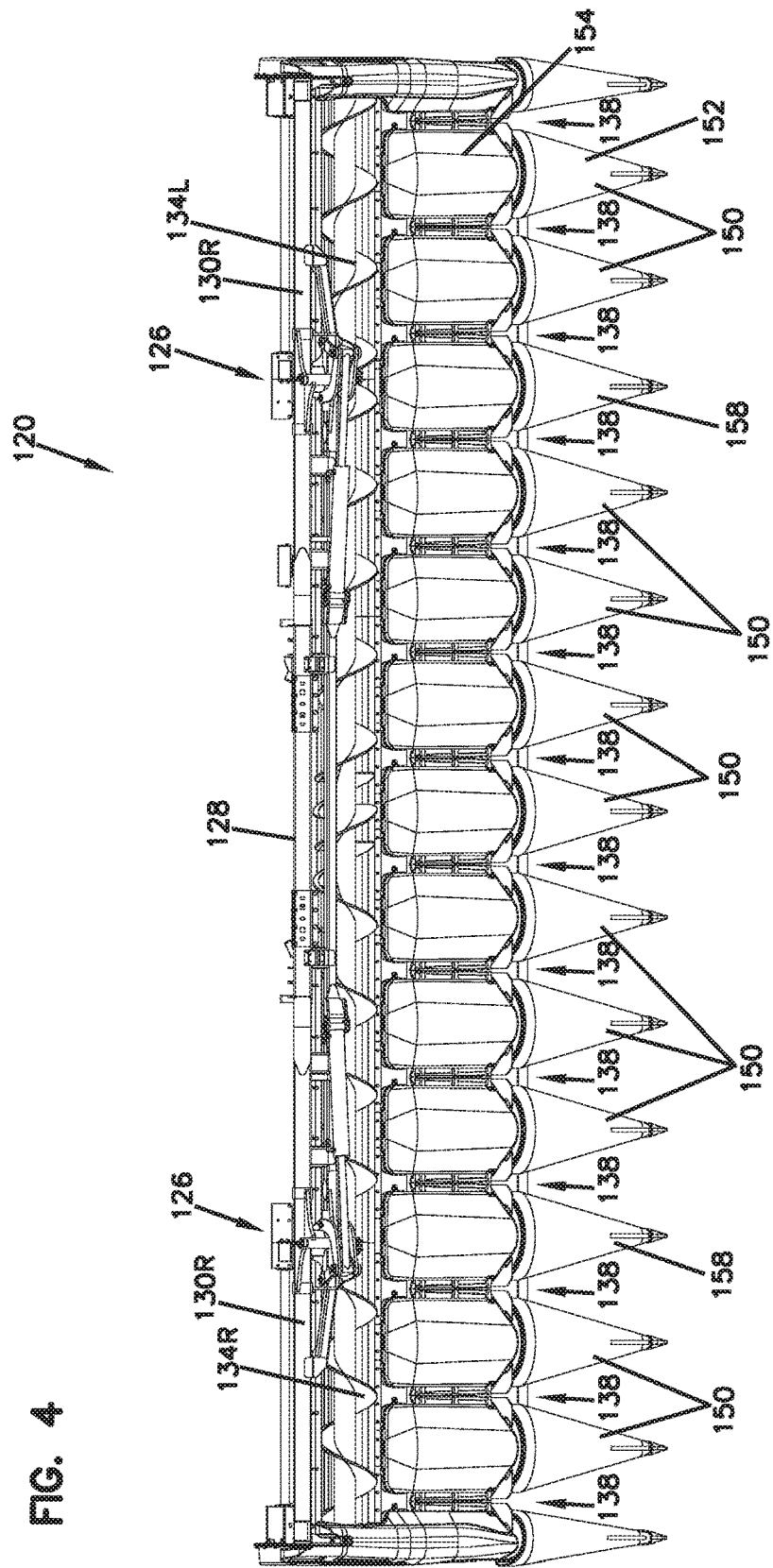
FIG. 4 is a top plan view of the corn head shown in FIG. 3.
Figure 5:
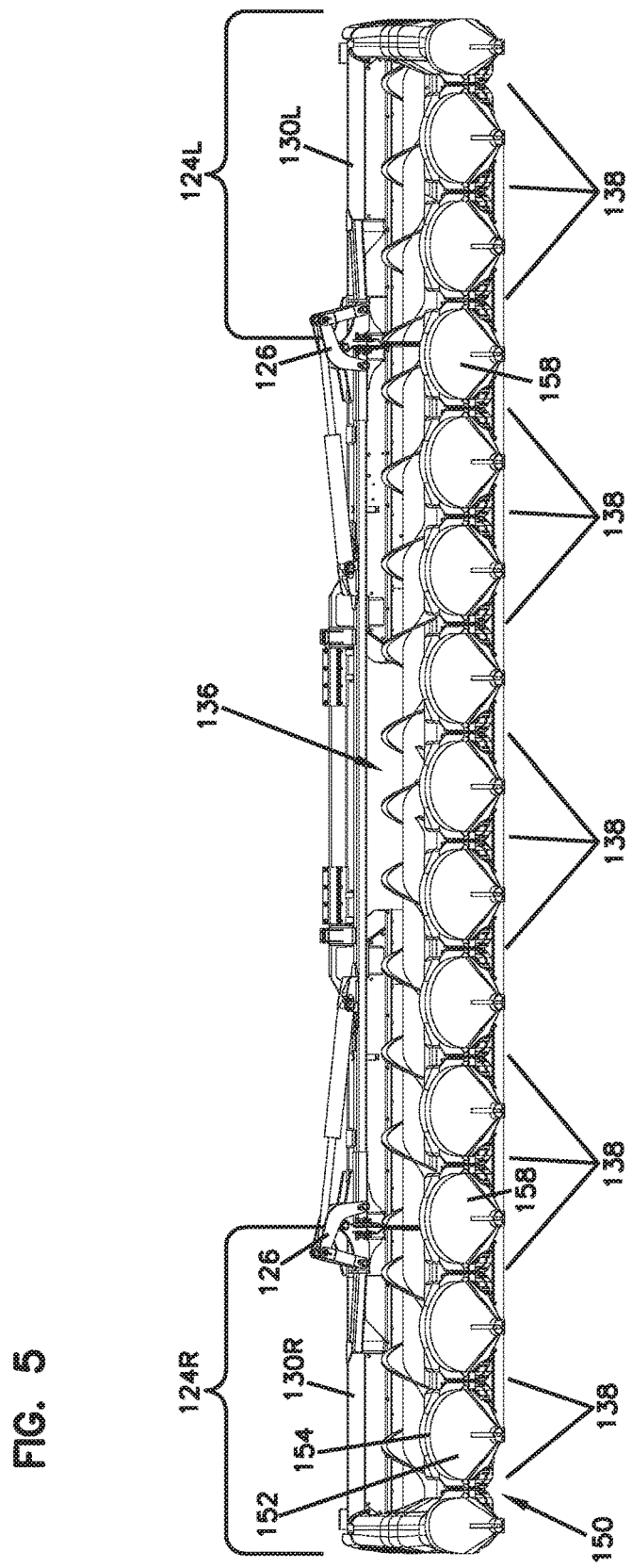
FIG. 5 is a front view of the corn head shown in FIG. 3.
Figure 6:
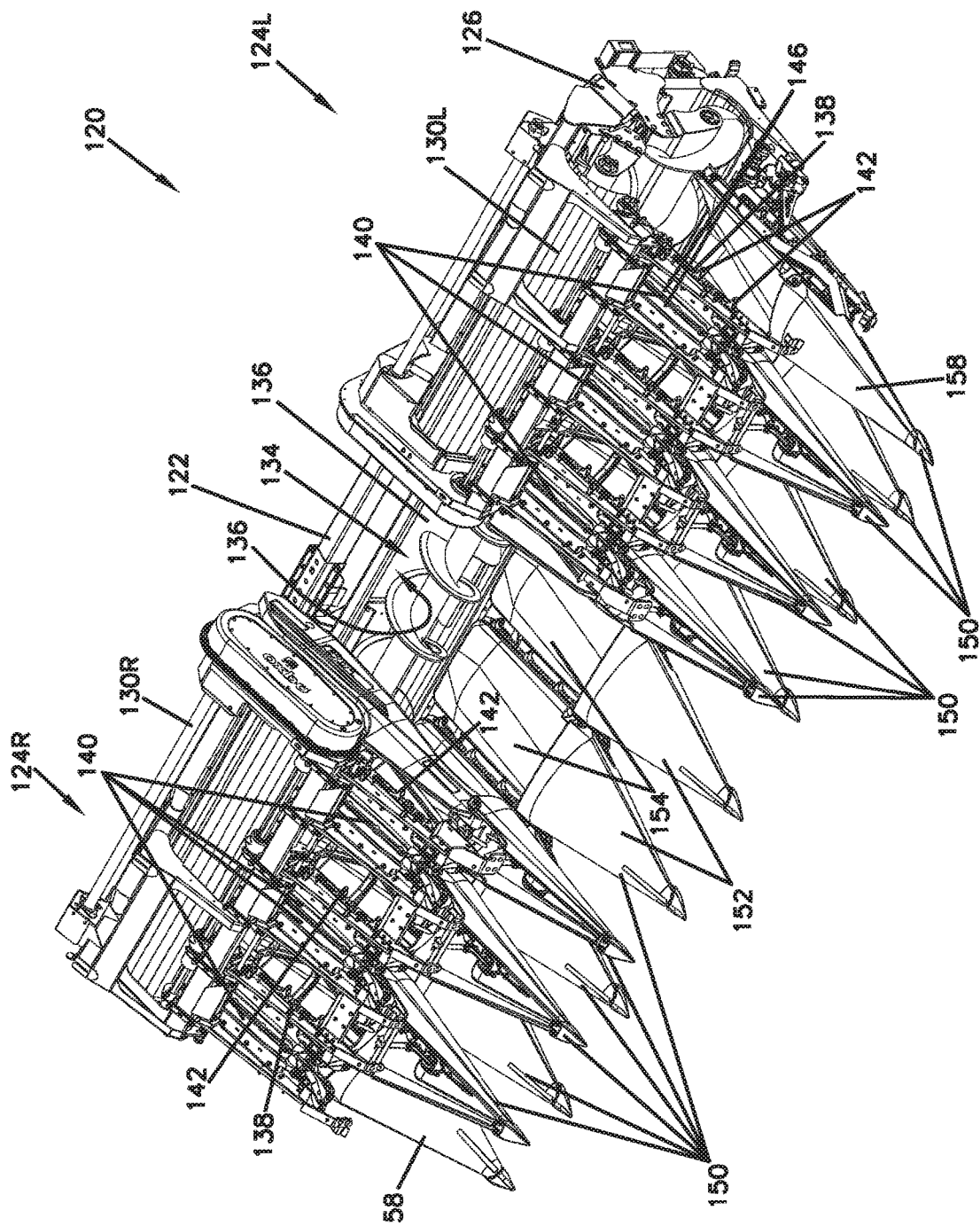
FIG. 6 is a perspective view of the corn head of FIG. 3 in a folded position.
Figure 7:
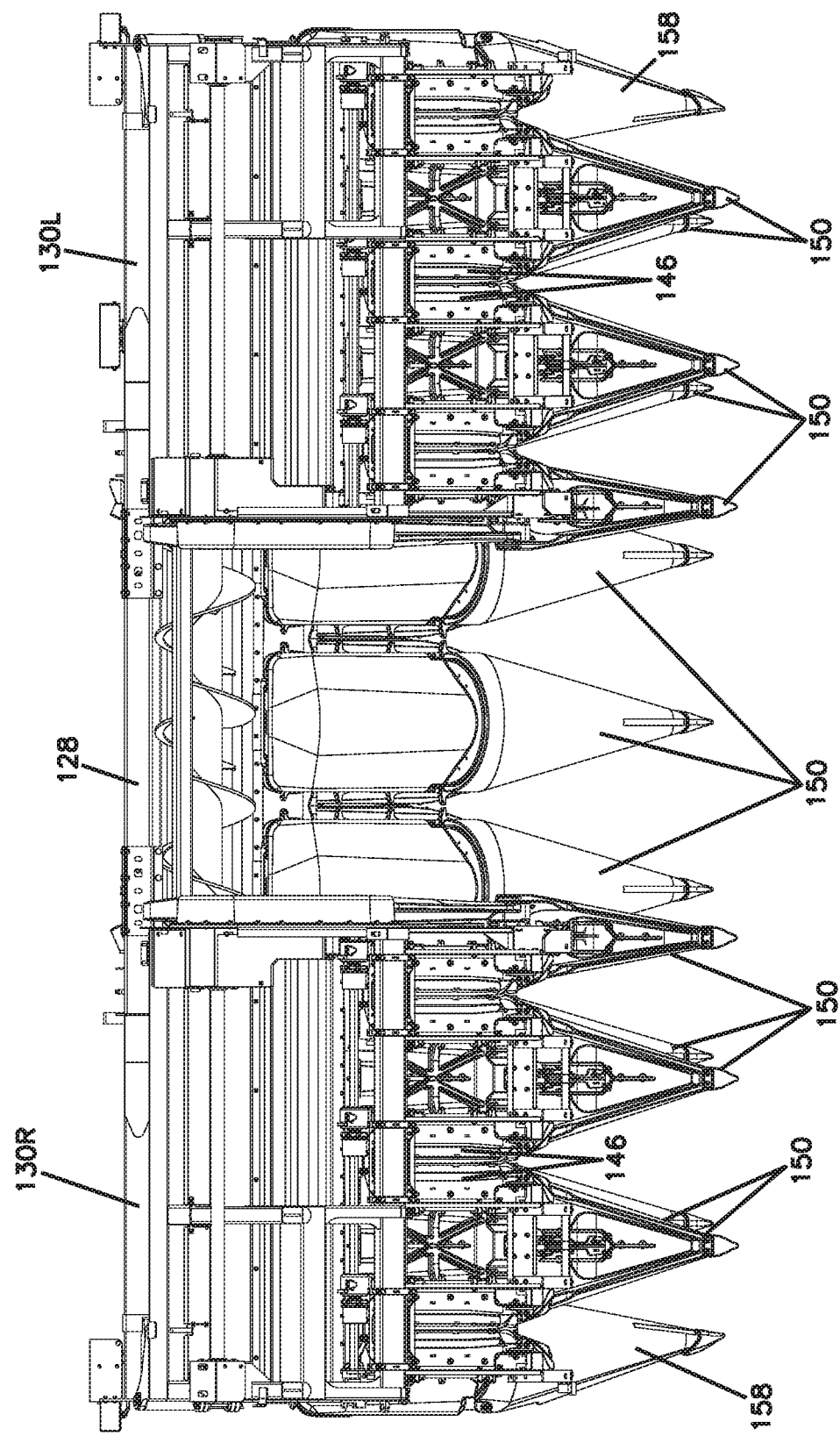
FIG. 7 is a top plan view of the corn head shown in FIG. 6.
Figure 8:
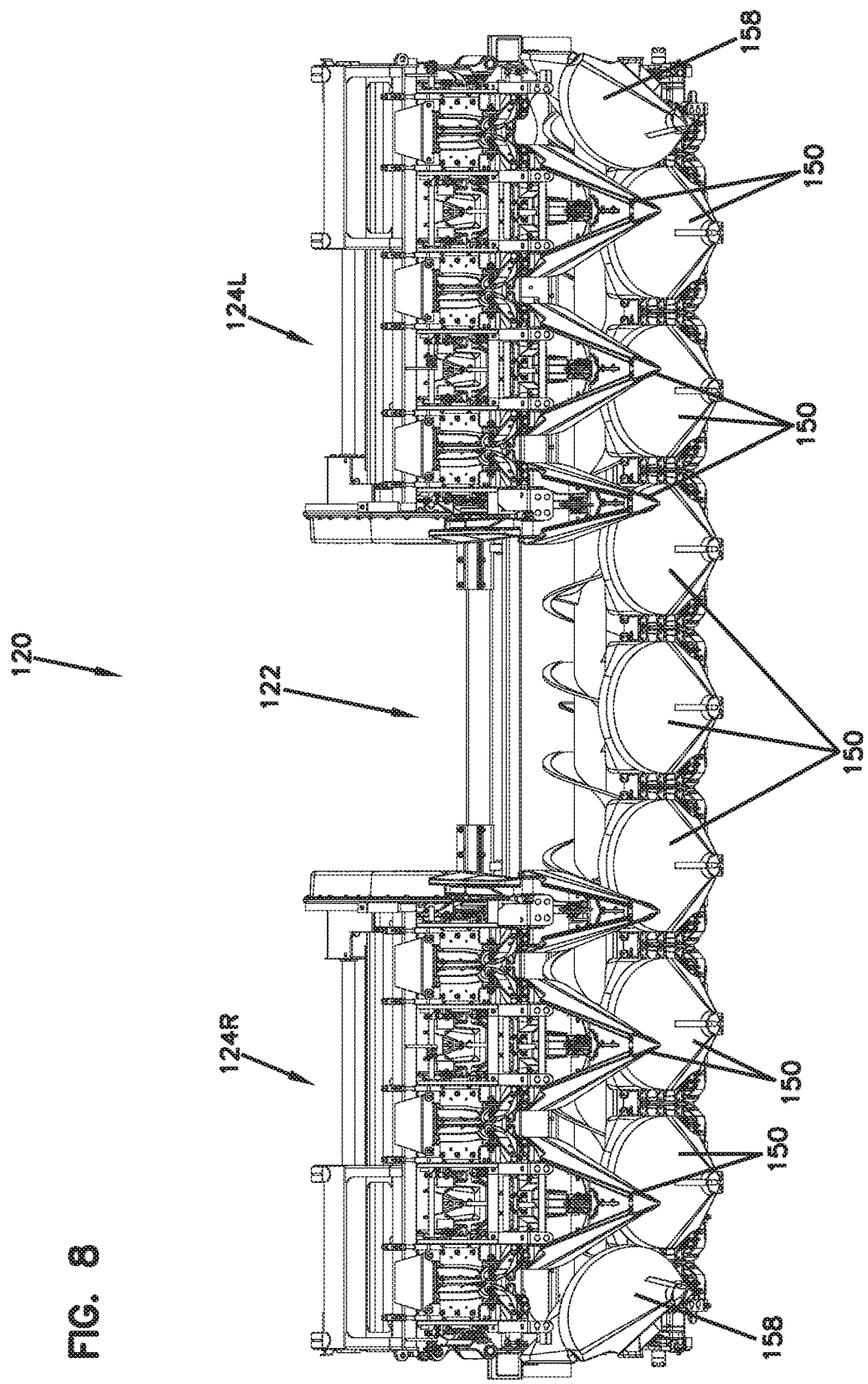
FIG. 8 is a front view of the corn head shown in FIG. 6.
Figure 9:
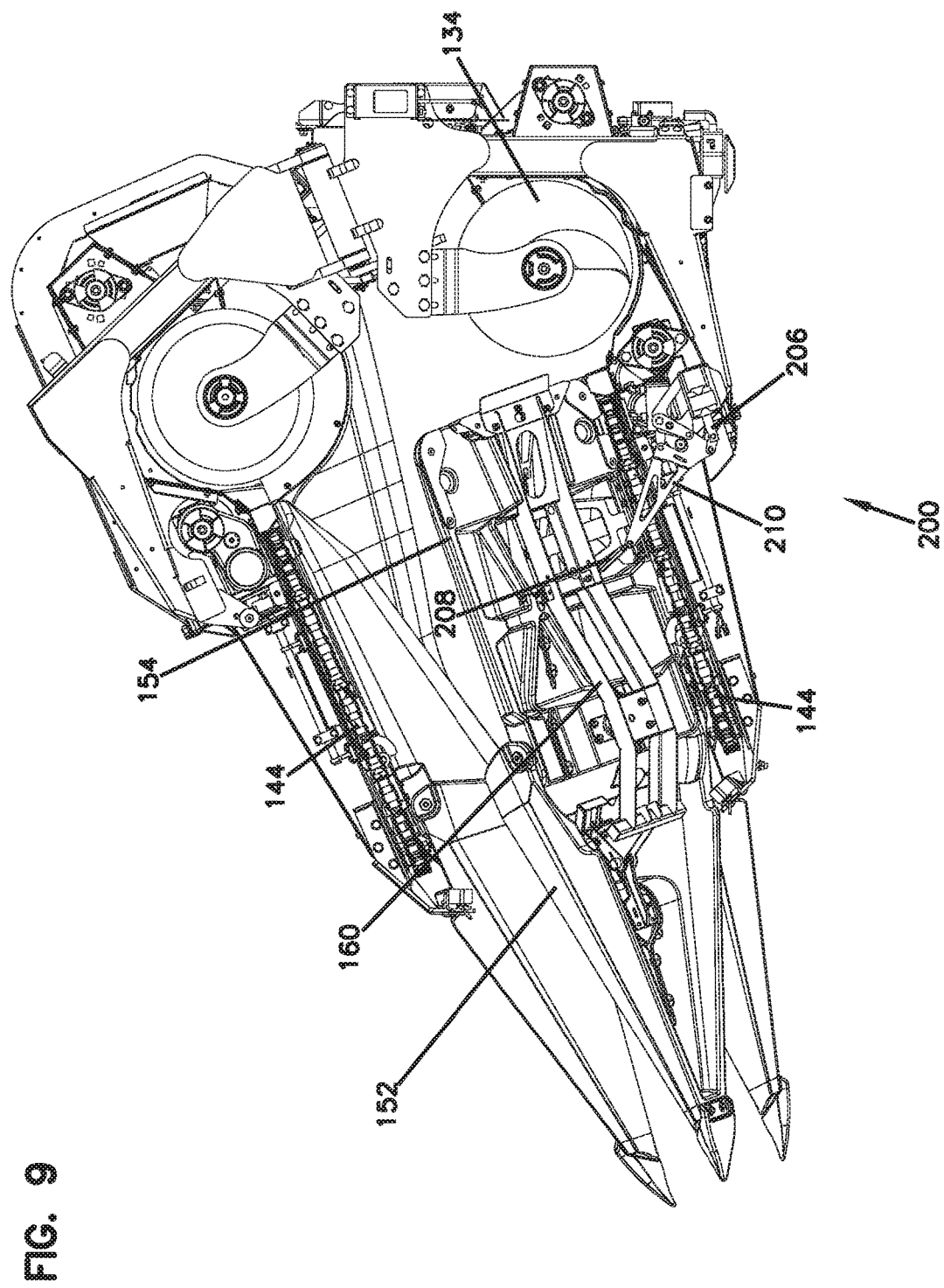
FIG. 9 is a sectional view taken along line 9-9 of FIG. 7.

Referring to FIGS. 3-9, the corn head (120) is a folding corn head that folds for transport and storage. The corn head (120) includes a center section (122) as well as outer folding sections including a left folding wing (124L) and a right folding wing (124R). The left wing (124L) and the right wing (124R) are configured to fold inward and over the center section (122) to reduce the width of the head for transport, as shown in FIGS. 6-9. The left wing (124L) and the right wing (124R) are extended for harvesting in the fields as shown in FIGS. 3-5. The head (120) includes an auger (134) extending transversely to the direction of travel including a left helical vane section (134L) and a right helical vane section (134R).

Row separators act as dividers (150) to direct the corn stalks into corn stalk gathering assemblies (138). The gathering assemblies pull the stalks through ear removal assemblies (140). Belts, chains or other gathering devices (144) may include paddles (142) or other elements that engage the corn stalks and pull them into opposed stalk rolls (146) that pull the stalks downward where the stalks are cut, broken and/or crushed so that the stalks may be returned to the field with improved decomposition. The ear removal assemblies (140) include stripper plates that separate the ears from the stalks. The ears pass to the auger (134) via belts and/or chains and are directed to the harvester's crop processing equipment.

The row separators (150) act as top covers for drives and several components for the corn stalk gathering assemblies (138). The row separators (150) generally are lightweight plastic or other durable materials that have a conical front section (152) and an arcing rear section that arches over an axis extending generally along the direction of travel.

It can be appreciated that the folding of the head (120) creates challenges; especially with the row separators (158) located proximate the hinge portions (126). If the row separator cover (158) is not moved, it would otherwise occupy space that would prevent the folding action of the head (120) as the wings (124L and 124R) would occupy space needed for the portions of the center section (122) and/or the wings (124). Therefore, the row separators (158) at the fold must be configured as a folding row separator (158). By folding the row separator covers (158) to the position shown in FIGS. 6-9, sufficient space is created at the hinge so the wings (124L and 124R) are able to fold to the compact position shown in FIGS. 6-9. In the folded position, the left wings and right wings (124L and 124R) are inverted and extend over the center frame section (122).

Figure 15:
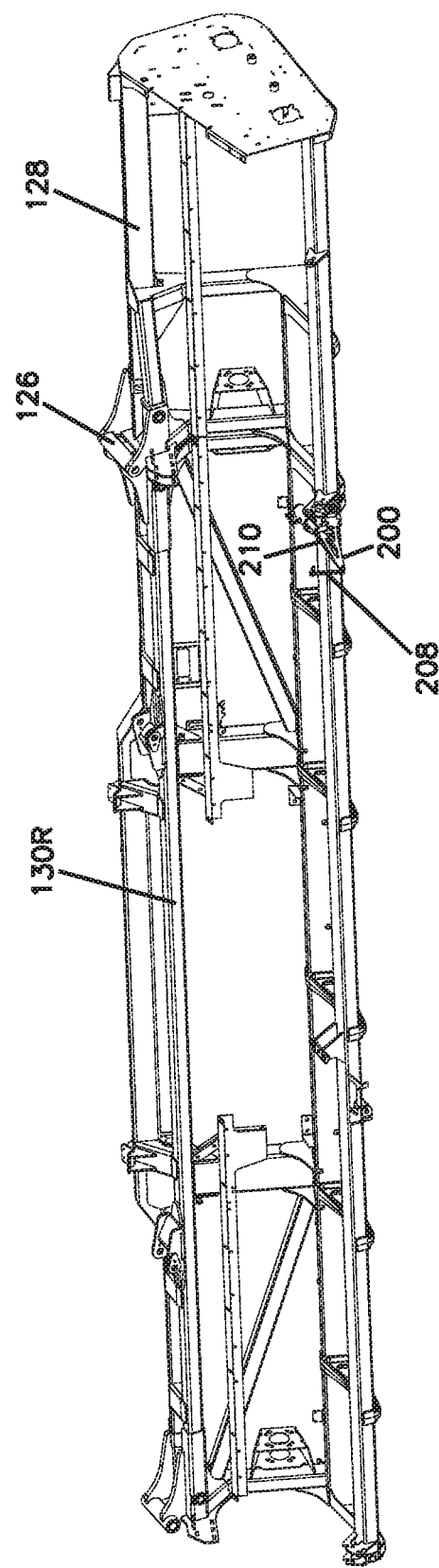
FIG. 15 is a perspective view of a lock for the row separator cover in a locked position.
Figure 16:
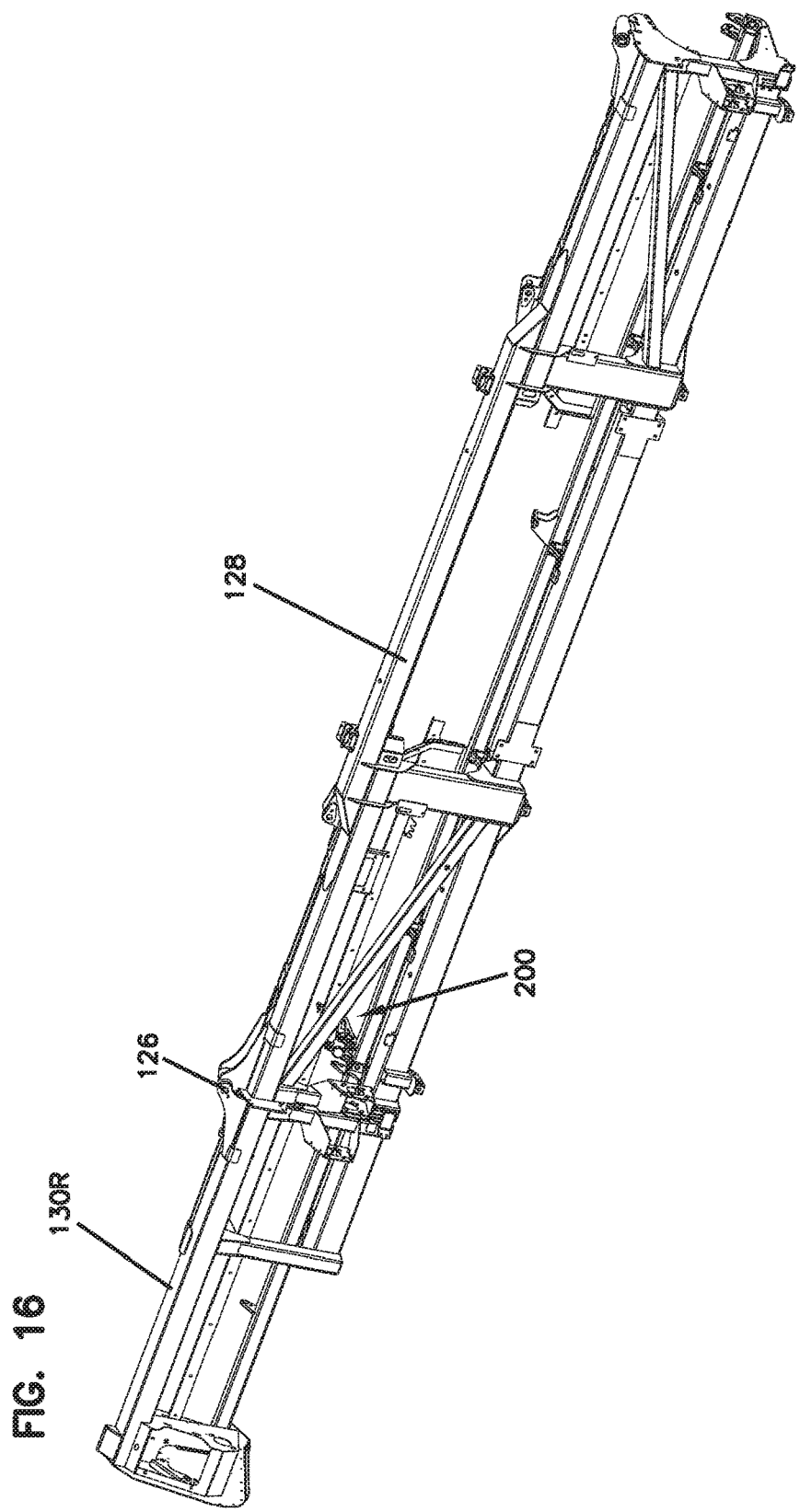
FIG. 16 is a perspective view of the lock of FIG. 15 in a released position.

Referring to FIGS. 15 and 16, there is shown a portion of the frame (128) of the center corn head section (122) as well as the right wing frame section (130R). It can be appreciated that the left and right wings (124L and 124R) are substantially mirror images. Although the right wing frame (130R) and its folding will be described, the description applies equally to the left wing frame (130L) and it's folding. For harvesting, the hinge (126) must be in a locked position when extended as shown in FIGS. 15 and 16.

Figure 10:
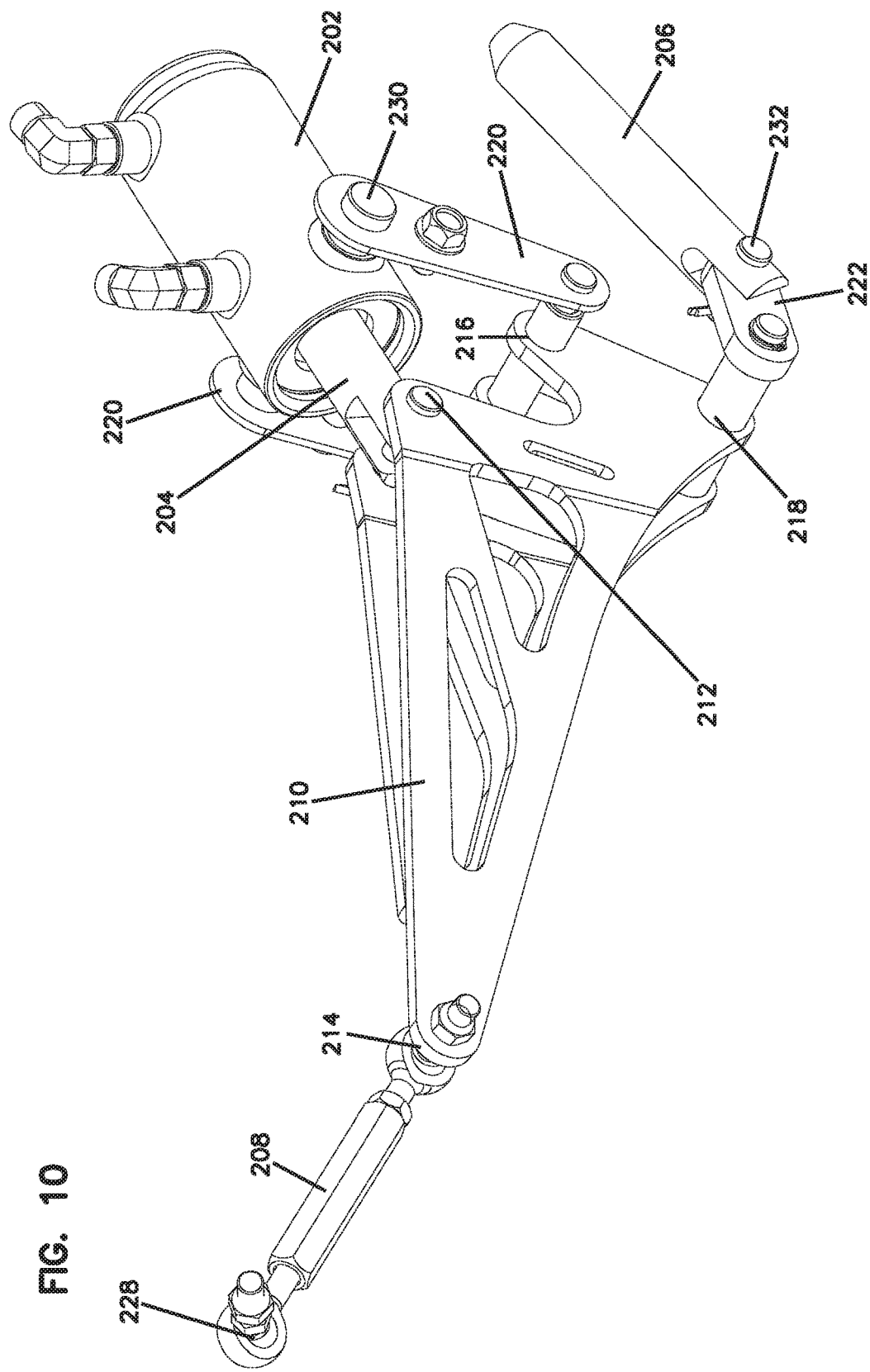
FIG. 10 is a perspective view of a linkage for folding a row separator cover.

To facilitate latching of the frame sections (130 and 128) and folding of the folding row separator covers (158), a combined folding and locking assembly (200) has been developed for the present invention, as shown in FIG. 10. The folding and locking assembly (200) includes a hydraulic cylinder (202) having a telescoping rod (204) that is extended and retracted. The extendable rod (204) connects to a pivoting main link (210) having four points (212, 214, 216 and 218) for pivoting with other elements. The main link (210) has two portions extending from opposed sides around the telescoping rod (204) that creates a framework and provides spaced apart pivots (212, 214, 216 and 218). The pivot (214) is a ball type joint that allows the arm (208)

flexibility. The arm (208) mounts at its opposite end at a ball type joint (228) to a frame (160) for the row separator cover (158).

Pivot (216) is a pin that connects to opposed arms (220) mounting to pivot pins on the cylinder (202). The pivot pin (216) is mounted to a portion of the main link (210) intermediate the pivot pins (212 and 218) and rearward toward the cylinder (202).

Pivot pin (218) is generally mounted below the other pivots and extends through an intermediate link (222) to a frame lock pin (206) and pivotally connects to the lock pin (206) by a pivot pin (232).

Referring now to FIGS. 11-14, the folding row separator cover (158) as well as the folding and latch assembly (200) and the frame (130R) and their relationship are shown. The frame (130R) includes a latch member (162) receiving the locking pin (206). In the locked position shown in FIGS. 12 and 13, the lock pin (206) extends through the receiver (162) and provides a secure mechanical lock as well as a visual indication that the wing (124) is lowered in a completely extended position and locked for harvesting operations. In this position, the rod (204) is extended to pivot the main link (210) downward. This pivoting motion of the main link (210) pulls the arm (208) downward and lowers the folding separator frame (160) and cover (158) downward. This motion of the main link (210) also lowers and actuates the pivot pin link (222) to push the locking pin (206) downward and rearward. Therefore, the locking pin (206) slides rearward and through to the locked position and secures the wing (124). The extension of the rod (204) also pushes the link (220) downward and rearward and therefore rotates the hydraulic cylinder (202) to a slightly downward orientation. The lowered row separator cover (158) provides a visual indication that the frame (130) is locked in a fully deployed harvesting position.

Figure 11:
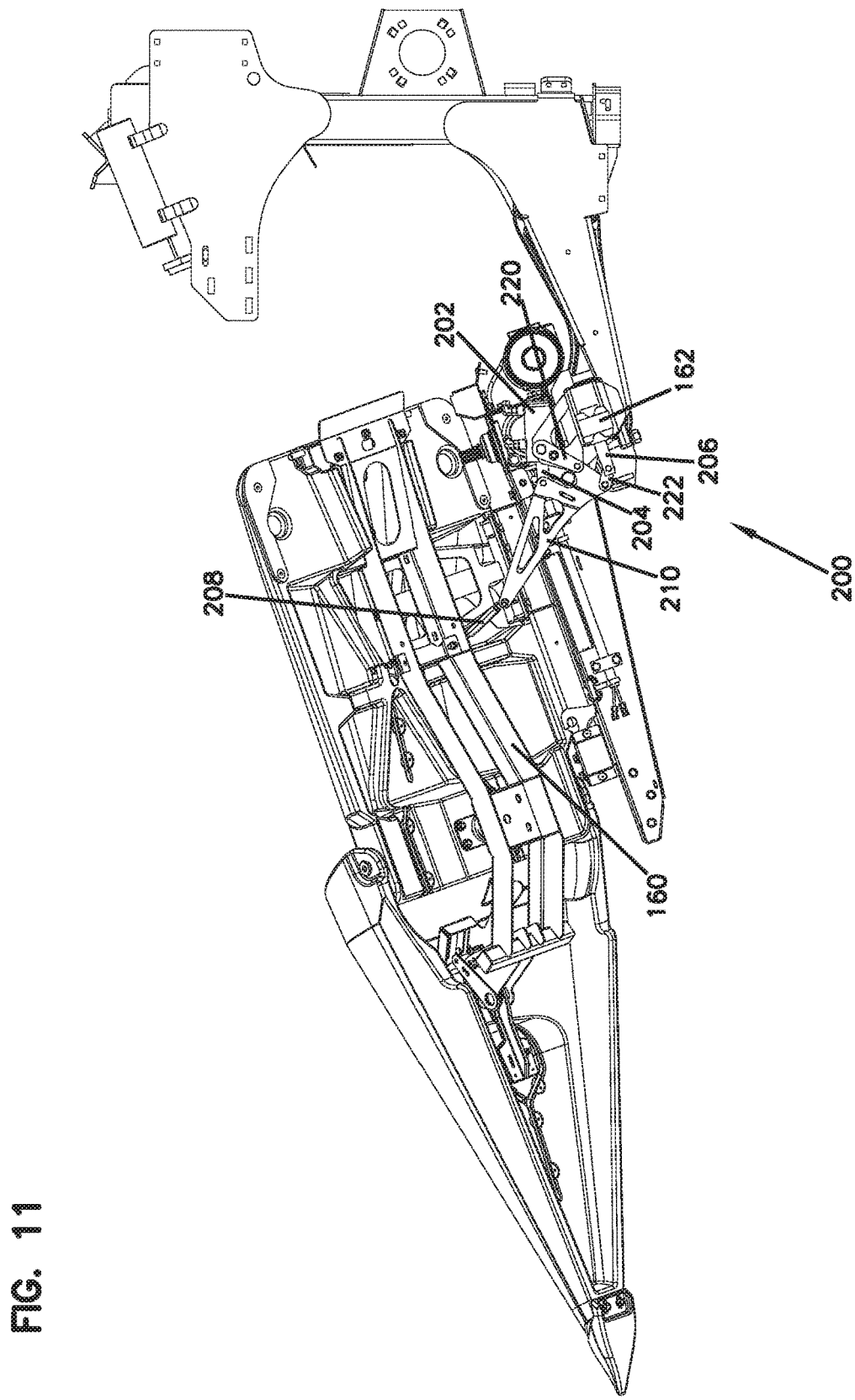
FIG. 11 is a side view of a row separator cover for the head of FIG. 3 with the cover open.
Figure 12:
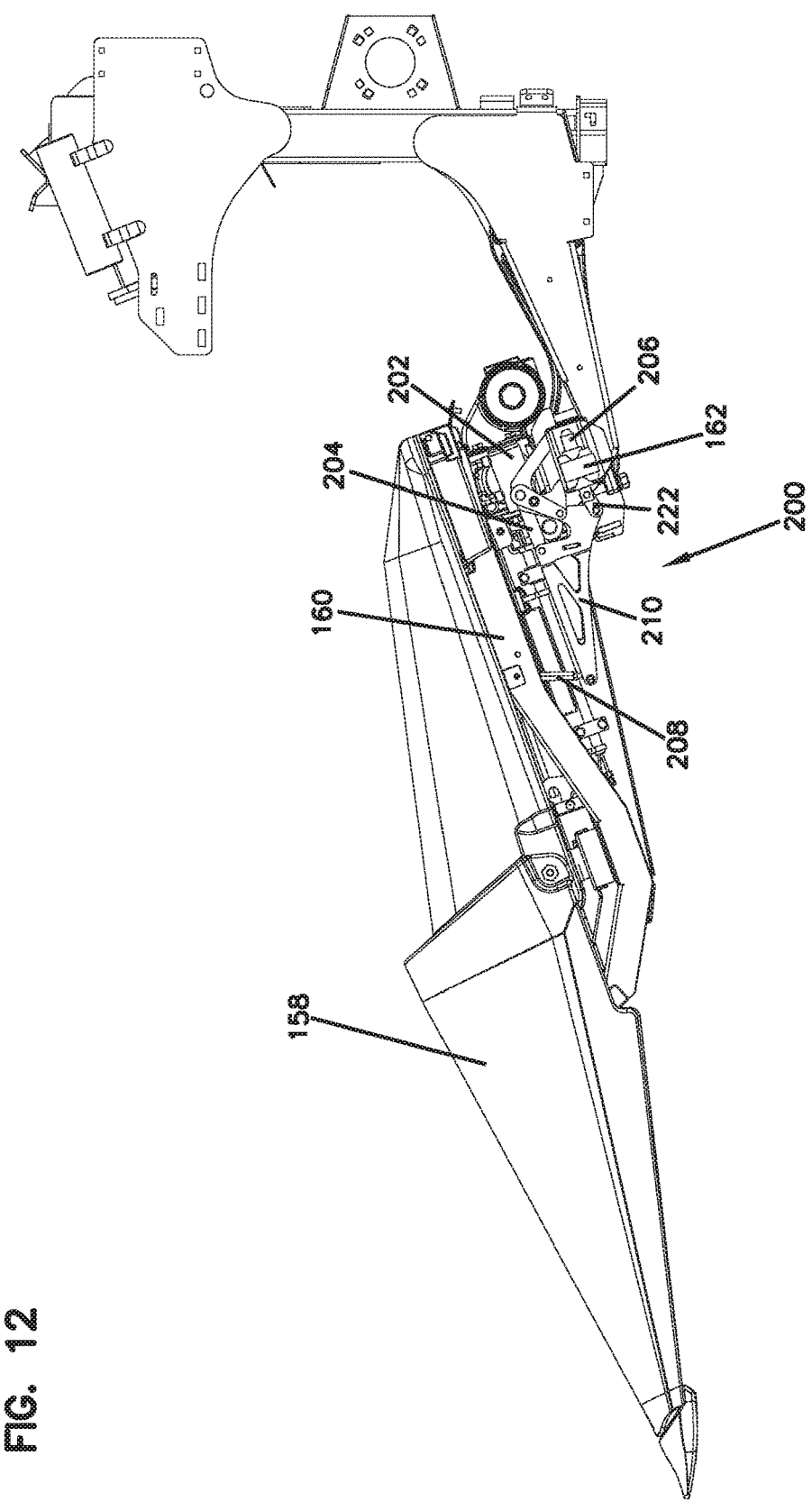
FIG. 12 is a side view of the row separator cover of FIG. 11 with the cover closed.
Figure 13:
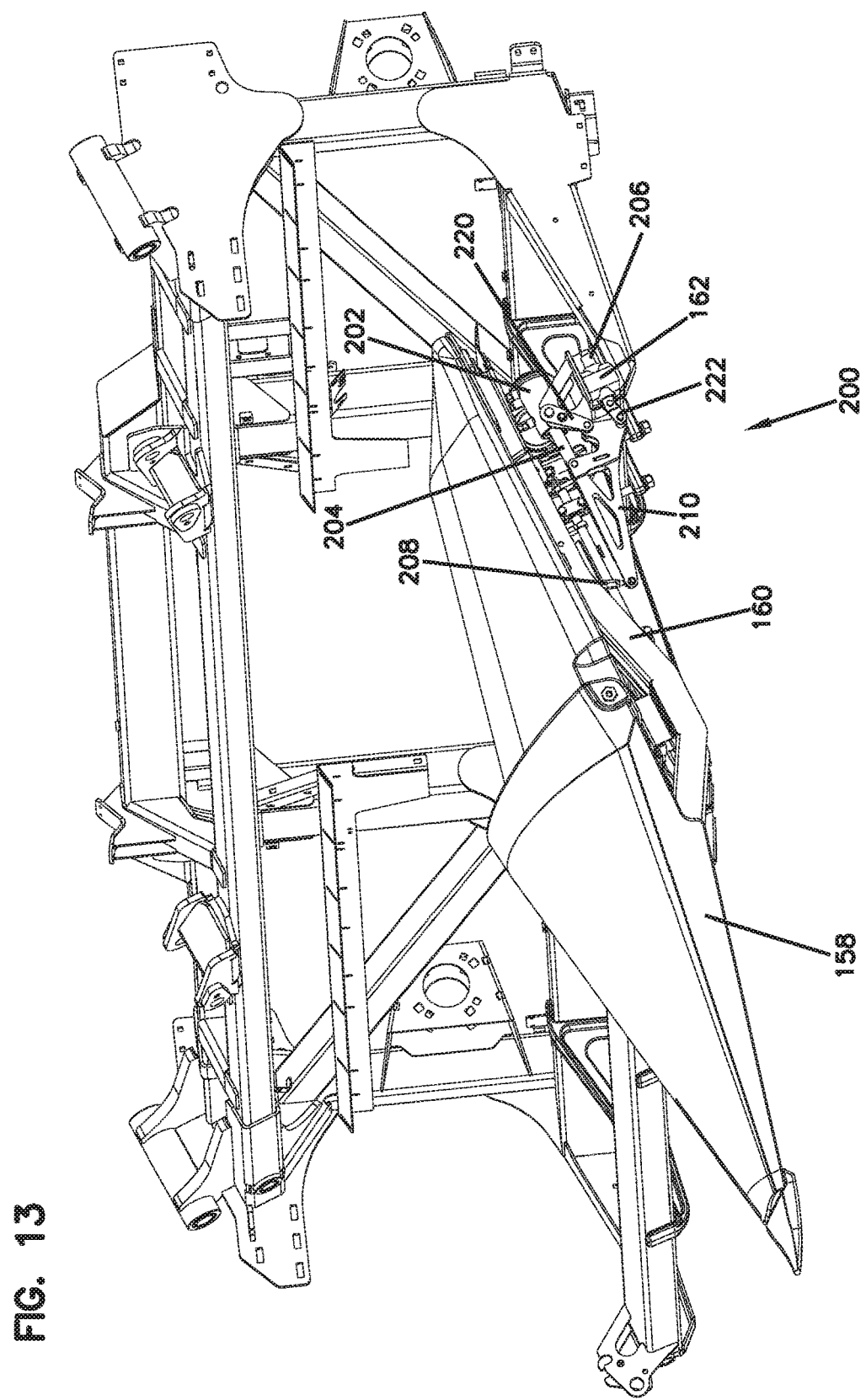
FIG. 13 is a perspective view of a row separator cover and the linkage for opening and closing the row separator cover of FIG. 11 with the row separator cover closed.
Figure 14:
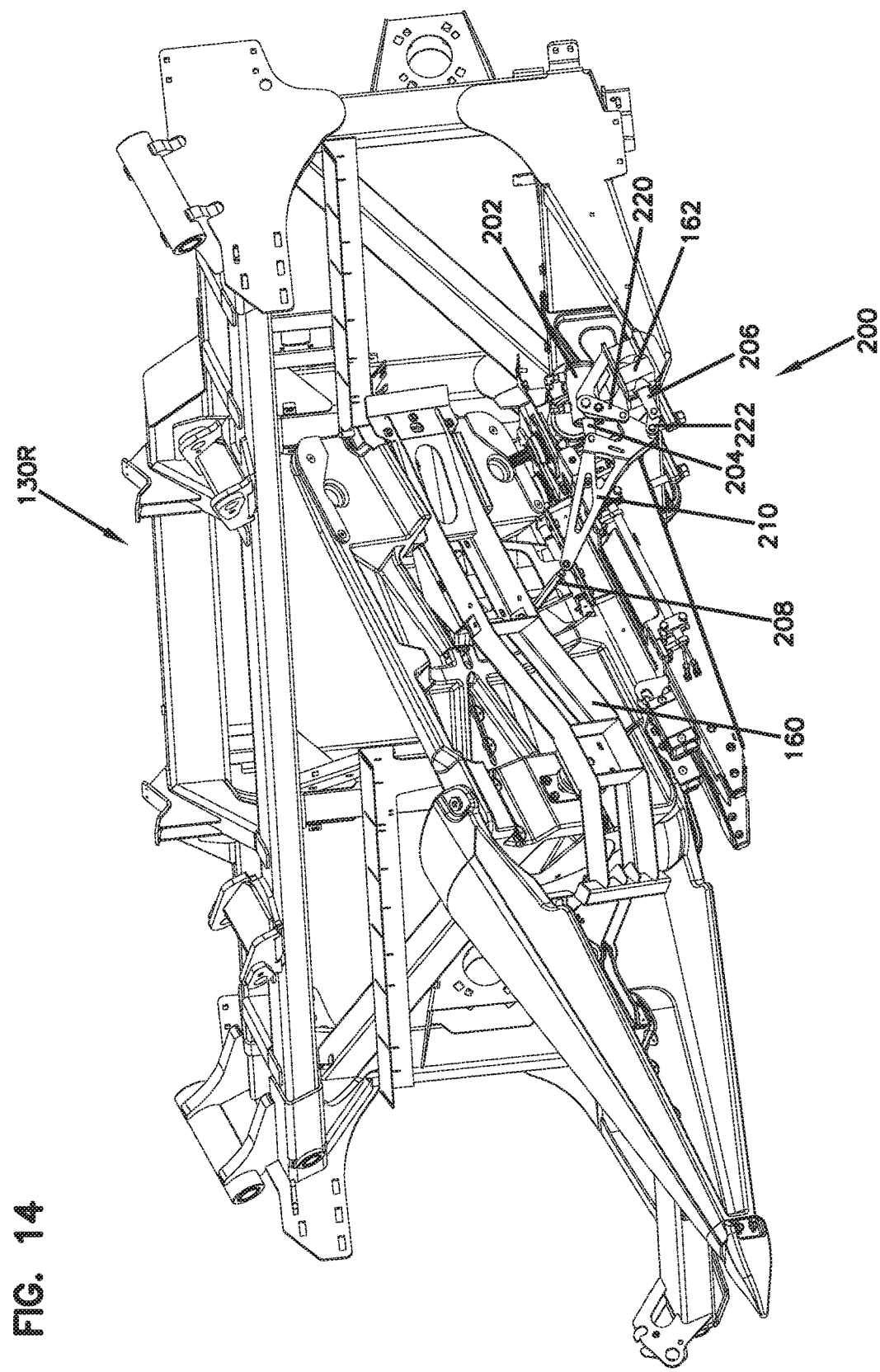
FIG. 14 is a perspective view of the row separator cover and the linkage of FIG. 13 with the row separator cover open.

Referring now to FIGS. 11 and 14, to unlock the frame (130R) from the center frame (128), the locking assembly (200) is actuated in an opposite direction so that the hydraulic cylinder (202) retracts the rod (204). This retraction of the rod (204) pulls the main link (210) upward and rearward. Raising the end of the main link (210) tends to raise the arm (208), which pushes the separator frame (160) and therefore the folding row separator cover (158) upward and to the side. In this position, the wings (124) may be folded without the row separator cover (158) hitting the adjacent row separators (150) and allows for the folding movement of the wings (124) of the head (120). The retraction of the rod (204) also pivots the hydraulic cylinder (202) upward, due to the linkage formed between the hydraulic cylinder (202), the rod (204), the main link (210) and the cylinder link (220). Moreover, the upward pivot of the main link (210) pulls the lower pivot pin (218) slightly upward and forward. This action pulls the link (222) and the locking pin (206) forward away from the orifice in the receiving lock portion (162). When the locking pin (206) is disengaged, the wings (124) are unlocked and may be folded. It can be appreciated that the same motion provides a single linkage that mechanically and automatically unlocks the frames (128, 130) and moves the folding row separator cover (158) to a position that allows for folding with a single actuation. The present invention therefore eliminates the need for separate actuators and assemblies for folding the row separators and for also locking the frame.

It can be appreciated that the present invention provides a clear indication that when the row separator cover (158) is folded and raised, that the folding wings (124) are unlocked and may be folded. However, if the folding row separator cover (158) is not raised, the frames are locked and the wings (124) cannot be folded. Moreover, the folding and latching assembly (200) also provides a clear indication that when the folding row separator (158) is in the lowered position, the frame sections are locked relative to one another and that the corn head (120) is properly configured and completely deployed for operation in a fully extended position.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A corn harvester comprising:
   a chassis;
   a harvester head, the harvester head comprising:
      a center section;
      a folding section folding relative to the center section, the folding section including a frame and a lock for locking the folding section in a locked position for harvesting;
      a plurality of row separators, each of the separators including a separator cover;
   the plurality of separators including a folding separator proximate a folding pivot of the folding section;
   a linkage associated with the folding separator, the linkage moving a folding separator frame and a folding separator cover between a lowered position and a raised position, the linkage comprising:
      a main link pivoting between a first position and a second position;
      a cylinder having an extendable rod, the rod connecting to a first point of the main link and actuating the main link;
      an arm mounted to a second point of the main link and connected to the folding separator frame;
      an intermediate link pivotally connecting to the main link and to the folding section lock;
   the linkage automatically engaging the folding section lock when the rod is extended and the folding separator is at the lowered position and automatically disengaging the lock when the rod is retracted and the folding separator is at the raised position.

2. A corn head comprising:
   a center section;
   a folding section folding relative to the center section including a frame and a lock for locking the folding section in a locked position for harvesting;
   a plurality of row separators, each of the separators including a separator cover; the plurality of separators including a folding separator proximate a folding pivot of the folding section;
   a linkage associated with the folding separator, the linkage moving the separator cover of the folding separator between a lowered position and a raised position, the linkage comprising:
      a main link pivoting between a first position and a second position;
      a cylinder having an extendable rod, the rod connecting to a first point of the main link and actuating the main link;
      an arm mounted to a second point of the main link and connected to a folding separator frame;
      an intermediate link pivotally connecting to the main link and to the folding section lock;

the linkage automatically engaging the folding section lock when the rod is extended and the folding separator is at the lowered position and automatically disengaging the lock when the rod is retracted and the folding separator is at the raised position.

3. A corn head according to claim 2, wherein the corn head is configured for mounting on a harvester.

4. A corn head according to claim 2, wherein the corn head is configured for mounting on a combine.

5. A corn harvester according to claim 1, wherein the folding section lock comprises a locking pin and a receiving portion, the receiving portion defining an orifice; and wherein the locking pin extends into the orifice in the locked position and is disengaged from the orifice in an unlocked position.

6. A corn harvester according to claim 5, wherein the locking pin pivotally connects through the intermediate link to a pivot pin and to the main link.

7. A corn harvester according to claim 1, wherein the main link comprises:
   a first pivotal connection pivotally connecting the main link to the rod;
   a second pivotal connection pivotally connecting the main link to the cylinder;
   a third pivotal connection pivotally connecting the main link through the arm to the folding section frame;
   a fourth pivotal connection pivotally connecting the main link through the intermediate link to the locking pin.

8. A corn harvester according to claim 7, comprising a ball joint connecting the arm to the folding separator frame.

9. A corn head according to claim 2, wherein the folding section lock comprises a locking pin and a receiving portion, the receiving portion defining an orifice; and wherein the locking pin extends into the orifice in the locked position and is disengaged from the orifice in an unlocked position.

10. A corn head according to claim 9, wherein the locking pin pivotally connects through the intermediate link to a pivot pin and to the main link.

11. A corn head according to claim 2, wherein the main link comprises:
    a first pivotal connection pivotally connecting the main link to the rod;
    a second pivotal connection pivotally connecting the main link to the cylinder;
    a third pivotal connection pivotally connecting the main link through the arm to the folding section frame;
    a fourth pivotal connection pivotally connecting the main link through the intermediate link to the locking pin.

12. A corn harvester according to claim 11, comprising a ball joint connecting the arm to the folding separator frame.

* * * * *